United States Patent Office 3,483,141
Patented Dec. 9, 1969

3,483,141
CARBON-NITROGEN BACKBONE CHAIN POLYMERS
Morton H. Litt, Alan J. Levy, and Taghi G. Bassiri, Morristown, N.J., assignors to Allied Chemical Corporation, New York, N.Y., a corporation of New York
No Drawing. Filed July 13, 1964, Ser. No. 382,343
Int. Cl. C08g 33/06
U.S. Cl. 260—2    40 Claims This invention relates to a new class of carbon-nitrogen backbone chain polymers. More particularly this invention relates to carbon-nitrogen backbone chain polymers having an acyl group side chain attached to the nitrogen atom.

Heretofore a number of polyamides such as 6—6 nylon and 6-nylon have been produced, but the acyl groups of these polyamides are contained in the backbone chain. In accordance with the present invention, polymers have been prepared which are composed essentially of recurring units of the formula:

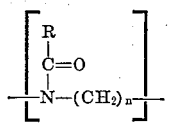

wherein $n$ in each unit is independently an integer of from 2 to 3 and R can be any monovalent radical which does not interfere with the polymerization and in particular R in each unit can be a member independently selected from the group consisting of hydrocarbon radicals and halogenated hydrocarbon radicals. More specifically we have prepared polymers in which R is alkyl such as methyl, isobutyl, pentyl, heptyl and undecyl; halogenated alkyl such as dichloromethyl, trichloromethyl, pentafluoroethyl and pentadecafluoroheptyl; aryl such as phenyl and naphthyl; halogenated aryl such as p-chlorophenyl; aralkyl such as benzyl; alkylaryl such as tolyl; saturated alicyclic such as cyclohexyl; and alkenyl such as decenyl. The number of carbon atoms in the radical R is not critical but preferably R contains between 1 to 20 carbon atoms. Additionally by copolymerization, there can be prepared copolymers containing units which differ both as to the R substituent and the value of $n$.

The properties of the polymers obtained vary considerably, depending upon both the acyl side chain, or R group involved and the value of $n$. The polymers are in general soluble in m-cresol and dimethylformamide, and these solvents can be used to produce solution cast films. Additionally, as can be readily determined by testing, there are various other solvents such as carbon tetrachloride, trichloroethylene, p-xylene, methanol and chloroform, which will dissolve one or more of the polymers. Those polymers in which R is methyl, ethyl or isopropyl are water soluble and are particularly useful as adhesives and thickening agents in watersoluble paints and aerosol sprays. The polymers which are not soluble in water can be used in molding compositions, while those polymers which are crystalline can be drawn into fibers useful in the manufacture of textiles.

A particularly useful series of polymers are those in which R is a fluoroalkyl group terminated by a trifluoromethyl group, said R substituent having the formula $CF_3(CX_2)_n-$, wherein $n$ is an integer of from 0 to 15, and X at each occurrence is hydrogen or halogen, especially fluorine or chlorine. All of these fluorine-containing polymers posses excellent water repellent properties, and those polymers in which the ends of the side chains comprise 5 or more fluorinated carbon atoms are also outstanding as oil repellents. The fluorine-containing polymers can be formed into water-repellent sheets and fibers or used as water-repellent coatings, and those polymers having side chains with 5 or more fluorinated carbon atoms at their ends are particularly useful as water- and oil-repellent coatings for leather and fabric. Such coatings may be conveniently applied from solution using a solvent such as 2,5-dichlorobenzotrifluoride.

The polymers which contain trimethylene groups in the backbone chain generally have glass transition temperatures which are about 30° C. lower than the glass transition temperature of the ethylene group containing polymers having the same side chains. The term "glass transition temperature" refers to a second order transition temperature which can be determined by plotting the apparent modulus of rigidity of a sample as a function of temperature in accordance with ASTEM test D–1043–61T. The apparent modulus of rigidity drops rapidly during the transition period. For amorphous polymers, the glass transition temperature was taken as the temperature of which the moduls of rigidity was $1.45 \times 10^4$ p.s.i., while for semicrystalline or crystalline polymers the glass transition temperature was taken as the temperature at which tangents of the modulus curve before and during the transition period intersect.

The polymers of this invention wherein $m$ is equal to 2 can be prepared by the polymerization of N-acyl ethyleneimines. However, utilizing this procedure, we have to date only been able to produce low molecular weight polymers having reduced viscosities of less than 0.5 dl./gm. as measured in a 1% m-cresol solution at 25° C.

In the preferred process of our invention the polymers are prepared by the polymerization of heterocyclic monomers of the formula:

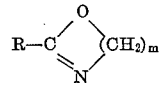

wherein R and $m$ have the meanings given above resulting in the production of the desired high molecular weight, high viscosity polymers. These monomers include 2-substituted-2-oxazolines and 2-substituted-5,6-dihydro-1,3,4-oxazines. High viscosity polymers, i.e. having a reduced viscosity of at least 0.5 dl./gm. as measured in a 1% m-cresol solution at 25° C., are needed for the production of fibers and films, but they are not required for other uses such as coatings.

The polymerization is conducted in the presence of a catalyst which can be an alkyl halide, a boron-fluorine compound, an antimony fluorine compound, a strong acid, a salt of a strong acid with an oxazoline or an oxazine, or an ester of a strong acid. Catalysts which can be employed include methyl iodide; 1,4-dibromobutane; boron trifluoride etherate; antimony pentafluoride; p-toluene sulfonic acid; dimethyl sulfate; sulfuric acid; nitric acid; perchloric acid; hydrobromic acid, hydroiodic acid; methyl sulfate; methyl p-toluene sulfonate; salts of 2-phenyl-2-oxazines, with perchloric acid, hydroiodic acid and toluene sulfonic acid and the perchlorate salt of 2-(p-chlorophenyl)-2-oxazoline. The temperature at which the polymerization is carried out may range from about 20° to 250° C. with a preferable temperature range being from about 80 to 200° C. The time required to polymerize the monomer may vary from several minutes to several days depending on the reactants, temperature, the particular monomer used, the catalyst employed, and the desired molecular weight. In general it is preferred to employ a molar ratio of about 50 to 60,000 mols of monomer per mol of catalyst.

The monomers used in preparing the polymers by the preferred process of the present invention can be obtained in accordance with the procedures described in the copending United States application of Morton H.

Litt and Alan J. Levy, Ser. No. 382,342, and our copending United States application Ser. No. 382,350, filed concurrently herewith, now U.S. Patent No. 3,293,245, or by heating the N-(ω-hydroxyalkyl)-amide in the presence of sulfuric acid in accordance with known procedures. The monomers can also be produced by the cyclodehydrohalogenation of an N-(ω-chloroalkyl) amide of the formula:

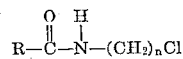

wherein R and $n$ have the meanings given above. This cyclodehydrohalogenation can be accomplished by treating the N-(ω-chloroalkyl)-amide with sodium hydroxyide in accordance with known procedures.

The polymers which we have prepared include poly-(N-ethylene acetamide);
poly(N-ethyleneperfluorooctamide);
poly(N-trimethyleneperfluorooctamide);
poly(N-ethyleneperfluoropropionamide);
poly(N-ethylenepropionamide);
poly(N-ethylene n-butyramide);
poly(N-ethylene isobutyramide);
poly(N-ethylene n-valeramide);
poly(N-ethylene isovaleramide);
poly(N-ethylene pivalamide);
poly(N-ethylene n-caproamide);
poly(N-ethylene n-heptanoamide);
poly(N-ethylene caprylamide);
poly(N-ethylene lauramide);
poly(N-ethylene dichloroacetamide);
poly(N-ethylene trichloroacetamide);
poly(N-ethylene benzamide);
poly(N-ethylene p-chlorobenzamide);
poly(N-ethylene phenylacetamide);
poly(N-ethylene cyclohexylamide);
poly(N-ethylene p-toluamide);
poly(N-ethylene β-naphthoamide);
poly(N-ethylene ω-undecylenamide);
poly(N-trimethylene acetamide);
poly(N-trimethylene propionamide);
poly(N-trimethylene-n-butyramide);
poly(N-trimethylene caproamide);
poly(N-trimethylene pivalamide); and
poly(N-trimethylene benzamide).

In addition to these homopolymers we have copolymerized 2-isopropyl-2-oxazoline and 2-(t-butyl)-2-oxazoline; 2-pentyl-5,6-dihydro-1,3,4-oxazine and 2-decenyl-2-oxazoline; 2-methyl-2-oxazoline and 2-decenyl-2-oxazoline; 2-undecyl-2-oxazoline and 2-isobutyl-2-oxazoline. The above listed polymers are set forth for illustrative purposes only and it will be apparent that many additional polymers and copolymers fall within the scope of the present invention.

The invention will be described further in conjunction with the following specific examples but it is to be understood that these are merely for purposes of illustration and are not intended to limit the invention thereto. In the following examples all viscosities were determined at 25° C. unless otherwise stated, and are in units of deciliters/gm. The intrinsic and reduced viscosities were calculated from the kinematic viscosity which was determined in accordance with the procedures of ASTM–D445–61, using a Cannon-Ubbelohde Dilution Viscometer No. 200 for determining intrinsic viscosity and a Cannon-Fenske Viscometer No. 300 for determining reduced viscosity. All melting points were determined by a hot stage microscope with crossed polaroids, unless otherwise stated.

Example 1

10 cc. of N-butyryl ethyleneimine and 0.05 cc. of $BF_3$ etherate were admixed in a tube and the tube was then degassed and sealed under vacuum. The sealed tube was placed in a constant temperature bath and maintained at 60° C. for 4 days in which time a white, semi-crystalline solid was formed. This solid was dissolved in 100 cc. of $CHCl_3$ and then precipitated by the addition of 1 liter of petroleum ether. This precipitate was redissolved in benzene and then reprecipitated by the addition of petroleum ether. The precipitate thus obtained was dried overnight in a cool vacuum oven yielding 6.3 grams of poly(N-ethylene n-butyramide) having a reduced viscosity of 0.16 in a 1% solution in benzene and a melting point of 150° C. by differential thermal analysis.

Example 2

155 cc. of ethyleneimine, 350 grams of $Na_2CO_3$ and 2000 cc. of distilled water were admixed in a three neck flask. A solution containing 345 cc. of benzoyl chloride and 1500 cc. of ether were then added dropwise to the flask while maintaining the reaction mixture at about 0° C. The reaction mixture was agitated until the reaction was complete, and then after standing the ether and water phases were separated by decantation. The ethereal solution was cooled by means of a Dry Ice-acetone bath thereby precipitating white crystals of N-benzoyl ethyleneimine having a boiling point of 74° C./0.5 mm., a melting point of 18°–19° C. and a refractive index of $n_D^{25}=1.5587$. The N-benzoyl ethyleneimine and a trace of lithium butyl was sealed in a tube under vacuum and heated at 60° C. for 10 hours and then at 100° C. for 2 hours. A glassy polymer of poly(N-ethylene-benzamide) was thereby produced having a reduced viscosity of 0.3 in a 1% solution in m-cresol.

Example 3

19 grams of 2-perfluoroheptyl-2-oxazoline prepared as in Example 1B of copending U.S. application Ser. No. 382,350, were distilled into a tube and .01 cc. of dimethylsulfate was added. The tube was sealed under reduced pressure and heated on a steam bath at 87–88° C. for 48 hours. The tube was then placed in an oil bath and heated at 160° C. for 18 hours. The perfluoroheptyloxazoline polymerized giving a 50% yield of poly(N-ethyleneperfluorooctamide) having a melting point of 245° C.

Example 4

5.58 grams of 2-(n-perfluoroheptyl)-5,6-dihpdro-1,3,4-oxazine, prepared as in Example 2B of copending U.S. application Ser. No. 382,350, and which had been distilled once through a Vigreux column was distilled through a spinning band directly into a tube and .006 ml. of dimethylsulfate were added. The tube was sealed under reduced pressure and placed in an oven at 40° C. The reaction temperature was raised slowly for 4 hours until it was 160° C. The polymerization was run at this temperature for 19 hours yielding poly(N-trimethyleneperfluorooctamide) having a melting point of 110° C., and had a reduced viscosity of 0.16 in a 0.5% solution in dichlorobenzotrifluoride at 135° C.

Example 5

0.03 cc. of dimethyl sulfate were added to 32 grams of 2-perfluoroethyl-2-oxazoline prepared as in Example 3B of copending U.S. application Ser. No. 382,350, and the reaction mixture was heated at 60° C. for 24 hours and then at 85° C. for 96 hours giving a 30% yield of poly(N-ethyleneperfluoropropionamide) having a melting point of 216° C., and a reduced viscosity of 0.06 in a 5% solution in dichlorobenzotrifluoride at 135° C.

Example 6

A solution was prepared by dissolving 2.0 grams of the poly(N-trimethyleneperfluorooctamide) prepared in Example 4 in 100 ml. of dichlorobenzotrifluoride at reflux temperature (175° C.). White cotton print cloth, desized, 80 x 80 count was impregnated with the polymer by total immersion at approximately 100° C. The excess solution was bloted off between hot paper towels at about 100° C.

to prevent precipitation of the polymer. The impregnated fabric was dried for 5 hours in a vacuum oven at 100° C. and then heat set for 5 minutes at 160° C. Tests were run on this impregnated fabric to compare its oil and water repellency to untreated fabric and fabric impregnated with poly(N-ethyleneoctamide). The results are summarized in the following table:

TABLE I

| Polymer | Blank | Poly(N-ethylene octamide) | Poly(N-trimethyleneperfluoro octamide) |
|---|---|---|---|
| Loading Weight [1] | | 2.2 | 2.6 |
| Water Repellency:[2] | | | |
| Laundering Cycle: | | | |
| 0 | 0 | 25 | 80 |
| 1 | | | 70 |
| 2 | | | 70 |
| 3 | | | 70 |
| Oil Repellency:[3] | | | |
| Laundering Cycle: | | | |
| 0 | 0 | 0 | 110 |
| 1 | | | 90 |
| 2 | | | 80 |
| 3 | | | 70 |

[1] Loading weight is percent based on untreated fabric.
[2] Water repellency spray test (ASTM-D-583-58). A rating of 100 denotes no sticking or wetting of upper surface; 90=slight random sticking or wetting of upper surface; 80=wetting of upper surface at spray points; 70=partial wetting of upper surface; 50= complete wetting of whole upper surface and 0= complete wetting of whole upper and lower surfaces.
[3] 3M Oil Repellency Test: Textile Research Journal, vol. 32, April 1962, p. 323.

Example 7

A 2-gram quantity of the poly(N-ethyleneperfluoropropionamide) prepared in Example 5 was dissolved in 100 ml. of 2,5-dichlorobenzotrifluoride at 150 °C. Cotton cloth of the type used in Example 4 was impregnated with the solution by total immersion at 150° C. The excess solution was blotted off on paper towels and the cloth dried for 16 hours. The impregnated cloth was then "heat set" for 5 minutes at 160° C. After being "heat set," the cloth which had a loading weight of 2.4% was subjected to the water and oil repellency tests described in Example 4. The results indicated a water repellency before laundering of 70 and an oil repellency before laundering of 60.

Example 8

50 grams of 2-methyl-2-oxazoline prepared according to the procedures described in Example 16 of copending U.S. application Ser. No. 382,342, was mixed with 0.01 cc. of dimethylsulfate (monomer to catalyst ratio of about 6000 to 1) and 55 grams of N-methylpyrolidone. The mixture was placed in a tube under a high vacuum and heated according to the following schedule: 40 hours at 97° C., 48 hours at 110° C., 96 hours at 135° C., and 48 hours at 157° C.

After the last heating period the N-methylpyrrolidone solvent was extracted with benzene leaving a solid polymer. This solid was ground to a powder, ether extracted in a Soxhlet apparatus and then dried in a vacuum oven for 5 hours at 100° C. The product thus obtained, poly(N-ethylene acetamide), had a melting point of 200° C., a reduced viscosity of $\eta$ sp./c.=0.89 in a 0.52% solution in meta-cresol, and was soluble in water.

Example 9

3 grams of 2-ethyl-2-oxazoline prepared according to the procedures described in copending U.S. application Ser. No. 382,342, were mixed with boron trifluoride etherate to give a monomer to catalyst mol ratio of about 1000 to 1 and the mixture was sealed in a tube under vacuum. The reaction mixture was heated at 72° C. for 48 hours and then at 120° C. for 6 hours resulting in the formation of a clear glassy polymer. This polymer, which was poly(N-ethylene propionamide) was soluble in water and had a reduced viscosity of 0.72 in a 0.52% solution in m-cresol.

Example 10

2-isopropyl-2-oxazoline was prepared by reacting iso- butryl chloride with ethyleneimine to form N-($\beta$-chloroethyl)-isobutyramide and then cyclodehydrohalogenating this amide in the presence of NaOH. 90 grams of 2-isopropyl-2-oxazoline and 0.04 cc. of boron trifluoride etherate (a monomer to catalyst mol ratio of about 2700 to 1) were sealed under vacuum in a tube. The reaction mixture was heated at 67° C. for 48 hours and then at 130° C. for 30 hours. There resulted a white polymer which was poly(N-ethylene isobutyramide) having a melting point of 210° C. and a reduced viscosity of 1.1 in a 0.52% solution in m-cresol.

Example 11

2-isobutyl-2-oxazoline was prepared by reacting isovaleric acid with 2-aminoethanol to form N-($\beta$-hydroxyethyl)-isovaleramide and then cyclodehydrating this amide in accordance with the procedure of copending U.S. application Ser. No. 382,342, by passing vapors of the amide through a column containing silica-alumina catalyst (Houdry S65 containing about 85% silica and 15% alumina) which had been heated to 200° C. A reaction mixture containing 2-isobutyl-2-oxazoline and dimethylsulfate in a monomer to catalyst ratio of 5000 to 1 was sealed in a tube under vacuum and heated at 95° C. for 24 hours, then at 110° C. for 48 hours and finally at 140° C. for 24 hours. The polymer produced was poly(N-ethylene isovaleramide) which has a melting point of 210° C. and a reduced viscosity of 2.5 in a 0.52% solution in m-cresol.

Example 12

2-n-heptyl-2-oxazoline was preared by reacting caprylyl chloride with ethyleneimine to form N-($\beta$-chloroethyl)-caprylamide and then cyclodehydrohalogenating this amide in the presence of NaOH. 95 grams of the 2-n-heptyl-2-oxazoline and 0.05 cc. of boron trifluoride etherate (a monomer to catalyst mol ratio of 2000 to 1) were sealed under vacuum in a tube. The tube was heated at 130° C. to 140° C. for 40 hours. A crystalline polymer was obtained which was poly(N-ethylene caprylamide) having a melting point of 160° C. and a reduced viscosity of 1.2 in a 0.52% solution in m-cresol.

A film of poly(N-ethylene caprylamide) was cast on a mercury substrate from a solution in carbon tetrachloride. The tensile properties of this film were determined using a procedure similar to that described in ASTM D-638-6IT with a speed of 2 in. per minute. The test sample had a yield strength of 2,900 p.s.i., a yield elongation of 17% and an ultimate tensile strength of 2,900 p.s.i.

Example 13

200 cc. of undecylenic acid were added to 120 cc. of thionyl chloride and the resulting reaction refluxed until reaction was complete. After the removal of excess thionyl chloride there was obtained a 90% yield of undecylenoyl chloride. An ethereal solution of undecylenoyl chloride and an equimolar portion of ethyleneimine were mixed slowly under reflux. At the completion of the reaction the reaction mixture was cooled to thereby precipitate N-($\beta$-chloroethyl)undecylenylamide. This amide was then cyclodehydrohalogenated to form 2-decenyl-2-oxazoline. 28 grams of the 2-decenyl-2-oxazoline and 0.03 cc. of boron trifluoride (a monomer to catalyst mol ratio of about 550 to 1) were sealed under vacuum in a tube. The tube was heated at 110° C. for 16 hours and then at 135° C. for 24 hours. The polymer produced was poly(N-ethylene-undecylenylamide) having a reduced visvosity of 0.87 in a 0.52% solution in m-cresol and a melting point of about 135° C.

Example 14

165 grams of hydroxyethylbenzamide were mixed with 150 cc. of concentrated sulfuric acid and the reaction mixture was heated to 140° C. and maintained at this temperature for 60 minutes. After cooling to room temperature, the reaction mixture was poured into 500 grams of chopped ice and neutralized with 25% aqueous sodium hydroxide. An oily layer formed which was decanted. The aqueous phase was extracted with ether and the extract added to the oil. The oil was dried, filtered and then distilled yielding 101 grams of 2-phenyl-2-oxazoline.

The 2-phenyl-2-oxazoline was mixed with 0.006 cc. of dimethylsulfate (a molar ratio of about 10,000 to 1) and the mixture was sealed under vacuum in a tube. The tube was heated at 90° C. for 40 hours and at 133° C. for 48 hours. The polymerizate obtained was poly(N-ethylene benzamide) having a crystalline melting point of 205° C. and a reduced viscosity of 4.2 in a 0.52% solution in m-cresol.

Example 15

A solution of 294 grams of dichloroacetyl chloride in 800 cc. of ethyl ether was mixed with 500 cc. of a solution containing 104 cc. of ethyleneimine in ethyl ether while maintaining the temperature of the reaction mixture between −5 and −15° C. The reaction mixture was then cooled in a Dry Ice-acetone bath thereby precipitating N-($\beta$-chloroethyl)dichloroacetamide which was recovered by filtration.

133 grams of the N-($\beta$-chloroethyl)dichloroacetamide were dissolved in 135 cc. of methyl alcohol following which 150 cc. of 5 N sodium hydroxide solution were added. An oily layer formed which was decanted. The remaining aqueous layer was extracted with ether and the extract added to the oil. The oily phase was then filtered and distilled yielding 86 grams of 2-dichloromethyl-2-oxazoline.

The 2-dichloromethyl-2-oxazoline was mixed with dimethylsulfate in a monomer to catalyst ratio of about 12,000 to 1 and the mixture was sealed in a tube under vacuum. The tube was heated at 95° C. for 36 hours giving 32 grams of crystalline poly(N-ethylenedichloroacetamide) which decomposed without melting at 250° C. and had a reduced viscosity of 0.18 in a 0.3% solution in m-cresol.

Example 16

N - ($\beta$-chloroethyl)phenylacetamide was prepared by reacting phenylacetyl chloride with ethyleneimine. 237 grams of this amide were mixed with 400 cc. of 3.75 N NaOH and 400 cc. of methyl alcohol and the reaction mixture was heated at 80° C. for 15 minutes. After adding water an oily layer formed on the bottom of the reaction mixture. This oily layer, which was 2-benzyl-2-oxazoline was separated out and purified by distillation.

The 2-benzyl-2-oxazoline was mixed with dimethyl sulfate in a mol ratio of about 1000 to 1 and the reaction mixture was sealed in a tube under vacuum. The reaction tube was heated at 130° C. for 40 hours giving poly(N-ethylene phenylacetamide) having a reduced viscosity of 0.21 in a 0.52% solution in m-cresol.

Example 17

2-$\beta$-naphthyl-2-oxazoline was prepared by reacting ethereal solutions of $\beta$-naphthoyl chloride and ethyleneimine at reflux temperature and cyclodehydrohalogenating the resulting N-($\beta$-chloroethyl)-$\beta$-naphtho amide in the presence of NaOH.

2-$\beta$-napthyl-2-oxazoline was mixed with dimethylsulfate in a monomer to catalyst mol ratio of about 2000 to 1 and the mixture was sealed in a tube under vacuum. The tube was heated at 120° C. for 24 and then at 150° C. for 16 hours yielding poly(N-ethyl-$\beta$-naphthoamide) having a melting point of 258° C. and a reduced viscosity of 0.92 in a 0.52% solution in concentrated sulfuric acid.

Example 18

137.5 grams of ethanolamine, 200 ml. of chloroform and 131 grams of p-chlorobenzoyl chloride were mixed in a flask for about 2 hours while maintaining the temperature of the reaction mixture below 30° C. by means of an ice bath. A precipitate formed which was recovered by filtration and then washed twice with 200 cc. quantities of chloroform. This solid was N-($\beta$-hydroxyethyl)-p-chlorobenzamide.

The amide was then added to concentrated sulfuric acid using about 2.4 mols of acid for each mol of amide. The reaction mixture was heated to 150° C. and maintained at this temperature for 1 hour following which it was cooled by the addition of ice. The reaction mixture was then neutralized with NaOH solution to thereby precipitate 2-(p-chlorophenyl)-2-oxazoline.

A series of 10 gram samples were polymerized in tubes which had been sealed under vacuum, using different proportions of catalyst and reaction conditions. The catalyst used in these experiments was the perchlorate salt of 2-(p-chlorophenyl)-2-oxazoline. This catalyst was prepared by adding 14.2 grams of perchloric acid to a solution of 18.15 grams of 2-(p-chlorophenyl)-2-oxazoline in 100 ml. of absolute ethanol while cooling the reaction flask in an ice bath. The perchlorate salt which was thereby produced precipitated and was separated by filtration. In the following table are given the reaction conditions and the monomer to catalyst mol ratios used and the reduced viscosities in a 0.52% solution of m-cresol of the poly(-N-ethylene-p-chlorobenzamide) polymers obtained.

TABLE 2

| Experiment | Monomer/ Catalyst, mol ratio | Time, hours | Temperature, ° C. | Reduced Viscosity |
|---|---|---|---|---|
| 1 | 2,000/1 | 24 | 129 | 1.6 |
| 2 | 2,000/1 | 24 | 160 | 1.7 |
| 3 | 10,000/1 | 24 | 160 | 3.1 |
| 4 | 2,000/1 | 2 | 200 | 1.4 |
| 5 | 2,000/1 | 8 | 200 | 2.0 |
| 6 | 10,000/1 | 8 | 200 | 3.5 |
| 7 | 40,000/1 | 24 | 200 | 3.0 |

Example 19

2-(p-tolyl)-2-oxazoline was prepared by the general procedure set forth in Example 18, first reacting p-tolyl chloride with ethanolamide to form N-($\beta$-hydroxyethyl) p-toluamide and then cyclodehydrating this amide in the presence of sulfuric acid.

The 2-(p-tolyl)-2-oxazoline was polymerized to form poly(N-ethylene-p-toluamide) in a series of experiments using the same catalyst and same procedure as used in Example 18. The following table gives the reaction conditions and the monomer to catalyst ratios used as well as the polymer melting point and the reduced viscosity of the polymer in a 0.52% solution in m-cresol.

TABLE 3

| Experiment | Monomer to Catalyst, ratio | Temperature, ° C. | Time, hours | Polymer Melting Point, ° C. | Reduced Viscosity |
|---|---|---|---|---|---|
| 1 | 10,000/1 | 200 | 4 | 262 | 3.6 |
| 2 | 10,000/1 | 200 | 8 | 260 | 4.4 |
| 3 | 2,000/1 | 200 | 4 | 260 | 1.6 |
| 4 | 10,000/1 | 160 | 24 | 260 | 6.2 |

Example 20

2-phenyl-5,6,dihydro-1,3,4-oxazine was prepared by reacting 3-aminopropanol with benzoic acid to form N-($\gamma$-hydroxypropyl)-benzamide and then cyclodehydrating this amide.

A series of experiments were run in which samples of this amide were polymerized to form poly(N-trimethylene benzamide) using a number of different catalysts and reaction conditions. All of the reactions were run in thick walled tubes having a neck topped by a 12/30 male joint. The monomer and catalyst were added to the tube which was then sealed under vacuum. During the reaction the tube was heated by a constant temperature bath. In Table 4 are set forth the catalyst, the monomer to catalyst mol ratio, the reaction time, the temperature, and the product viscosity for each of the experiments. The viscosities were measured in m-cresol and are given either as the intrinsic viscosity indicated as [η] or the reduced viscosity indicated as $\eta_{sp}/c$. In the latter case the concentration of the solution is indicated in parenthesis.

were slowly added. When the addition was complete the reaction mixture was heated to 145° C. and maintained at this temperature for 1½ hours. The mixture was cooled

TABLE 4

| Catalyst | Monomer/ Catalyst ratio | Reaction time, hours | Reaction time, temperature | Polymer Viscosity |
|---|---|---|---|---|
| MeI | 50/1 | 96 | 86 | [η]=0.17 |
| Br—(CH₂)₂—Br | 100/1 | 4 | 160 | [η]=0.23 |
| CH₃—C₆H₄—SO₃H | 500/1 | 12 | 130 | $\eta_{sp}/c$=1.6 (0.3% sln.) |
| phenyl-oxazine-CH₂I⁻ (N±CH₂, H) | 200/1 | 16 | 130 | $\eta_{sp}/c$=0.51 (1.5% sln.) |
| 20% oleum | 200/1 | 4.5 | 130 | $\eta_{sp}/c$=0.45 (1.5% sln.) |
| CH₃—C₆H₄—SO₃Me | 200/1 | 7 | 130 | $\eta_{sp}/$=0.55 (1.5% sln.) |
| phenyl-oxazine (N±CH₂, H) | 200/1 | 7 | 130 | $\eta_{sp}/c$=0.91 (1.5% sln.) |
| CH₃—C₆H₄—SO₃⁻ | | | | |
| (CH₃)₂SO₄ | 2500/1 | 6 | 160 | [η]=2.37 |
| phenyl-oxazine-CH₂ClO₄⁻ (N±CH₂, H) | 10,000/1 | 240 | 160 | [η]=2.68 |

The polymer produced with $(CH_3)_2SO_4$ catalyst was cast into a film and the tensile properties tested in accordance with the general procedure described in Example 10. The sample had a yield strength of 8,880 p.s.i., a yield elongation of 6% and an ultimate tensile strength of 8,890 p.s.i.

Example 21

2-methyl-5,6-dihydro-1,3,4-oxazine prepared in accordance with the procedure set forth in Example 3 of copending U.S. application Ser. No. 382,342, was mixed with the perchlorate salt of 2-phenyl-2-oxazoline in a molar ratio of 200 mols of the oxazine per mol of the perchlorate salt and the resulting mixture was sealed under vacuum in a tube. The sealed tube was heated in a constant temperature bath at 160° C. The poly(N-tri-trimethylene acetamide) thus produced was water soluble and had a reduced viscosity of 0.39 in a 1.5% solution in m-cresol.

Example 22

2-ethyl-5,6-dihydro-1,3,4-oxazine prepared in accordance with the procedure set forth in Example 5 of copending U.S. application Ser. No. 382,342, was mixed with the perchlorate salt of 2-phenyl-2-oxazoline in a molar ratio of 1000 mols of oxazine per mil of perchlorate salt and the resulting mixture was sealed under vacuum in a tube. The sealed tube was heated in a constant temperature bath at 130° C. for 17 days. The poly(N-trimethylene propionamide) thus produced was soluble in cold water and had an intrinsic viscosity of 0.73 in m-cresol.

Example 23

71.48 grams of N-(γ-hydroxypropyl)caproamide prepared in accordance with the procedure of Example 12 of copending U.S. application Ser. No. 382,342, were placed in a flask and 93.48 grams of 20% fuming sulfuric acid in an ice bath and then neutralized by being poured into a 20% NaOH solution. The mixture was then extracted with ether and dried over anhydrous NaSO₄. 35 grams of 2-n-pentyl-5,6-dihydro-1,3,4-oxazine were then recovered from the reaction mixture by distillation.

A mixture of the oxazine with p-toluene methyl-sulfonate in a 200/1 molar ratio was sealed under vacuum in a tube and heated at 130° C. for 136 hours. The product obtained was poly(N-trimethylene caproamide) which was insoluble in water and had an intrinsic viscosity of 0.65 in m-cresol.

Example 24

.032 mol of 2-pentyl-5,6-dihydro-1,3,4-oxazine, 0.024 mol of 2-decenyl-2-oxazoline and 0.00064 mol of dimethylsulfate were sealed in a tube under vacuum. The sealed tube was heated to 130° C. in a constant temperature bath and maintained at this temperature for 18 hours. A product was thereby produced which was found by nuclear magnetic resonance to be a copolymer composed of trimethylene caproamide units and ethylene undecylenylamide un its in a ratio 2.25/1.

Example 25

2-n-undecyl-2-oxazoline was prepared in accordance with the procedure of Example 18 of copending U.S. application No. 382,342 and was mixed with the perchlorate salt of 2-phenyl-2-oxazoline employing a molar ratio of 4,550 mols of the monomer per mol of the perchlorate salt. The resulting mixture was sealed under vacuum in a tube. The sealed tube was heated in a constant temperature bath at 130° C. for about 16 hours. On cooling there was obtained an opaque crystalline solid which was poly-(N-ethylene-n-lauramide) having a melting point of 155° C. and an intrinsic viscosity of 1.13 in phenylchloride.

Example 26

Into a tube containing 60 grams of anhydrous N-methyl pyrrolidone were added 26.2 grams of 2-methyl-2-oxazoline, 12.7 grams of 2-(ω-decenyl)-2-oxazoline and 0.04 cc. of dimethyl sulfate. The tube was degassed and sealed under vacuum. After heating at 150° C. for 66 hours, the tube was cooled and opened. The resulting product was dissolved in methanol and then precipitated from ethyl ether yielding a solid polymer. This polymer was dissolved in chloroform and reprecipitated from ether. The precipitated product was vacuum dried, yielding 35 grams of material, which NMR analysis showed to be a copolymer containing 5.6 mols of

for every mol of

A sample of the polymer was dissolved in trichloromethane and cast on paper, forming a clear, tough film. On being moistened, this film became sticky and reacted as an adhesive.

Example 27

2-cyclohexyl-2-oxazoline was prepared by reacting cyclohexylcarboxylic acid with ethanolamine and then cyclodehydrating the resulting product with sulfuric acid.

2-cyclohexyl-2-oxazoline was mixed with the same catalyst as employed in Example 18 in a monomer to catalyst ratio of 10,000 to 1 and the mixture was sealed in a tube under vacuum as in Example 18. The tube was heated at 160° C. for 15 hours yielding poly(N-ethylene cyclohexylamide) having a melting point of 285° C. and a reduced viscosity of 0.6 in a 0.52% solution in m-cresol.

Example 28

One part of 2-n-heptyl-2-oxazoline and 1.1 part of 2-cyclohexyl-2-oxazoline were admixed and then added to a tube along with the same catalyst as employed in Example 18 using a monomer to catalyst ratio of 1,000 to 1. The tube was sealed under vacuum and heated at 160° C. for 21 hours. A copolymer was obtained having a melting point of 205° C. and a reduced viscosity of 0.8 in a 0.52% solution in m-cresol.

Example 29

25.91 grams of 2-undecyl-2-oxazoline, 12.89 grams of 2-isobutyl-2-oxazoline and 0.35 ml. of a catalytic solution consisting of 0.007 gram of the perchloric acid salt of 2-(p-chlorophenyl)-2-oxazoline dissolved in acetonitrile were admixed in a flask. The flask was degassed and sealed under vacuum and then heated for 21 hours at 160° C. A copolymer was thus produced having a melting point of 160° C. and an intrinsic viscosity of 1.20 in m-cresol.

It will be apparent that many modifications and variations may be effected without departing from the scope of the novel concepts of the present invention, and the illustrative details disclosed are not to be construed as imposing undue limitations on the invention.

We claim:

1. A process for the preparation of polymers comprising recurring units of the formula

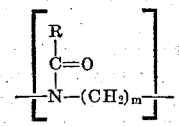

wherein $m$ is 2 or 3 and R is a hydrocarbon or halogenated hydrocarbon radical, which comprises heating monomer of the formula:

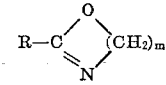

wherein $m$ and R are as defined above, at a temperature between about 20° and about 250° C. in the presence of catalyst selected from the group consisting of alkyl halides, boron-fluorine compounds, antimony-fluorine compounds, strong acids, salts of strong acids with oxazolines, salts of strong acids with oxazines and esters of strong acids, wherein the mol ratio of monomer to catalyst is between about 50:1 and about 60,000:1.

2. A process in accordance with claim 1 wherein said monomer is heated at a temperature between about 80° and about 200° C.

3. A process in accordance with claim 1 wherein said catalyst is selected from the group consisting of methyl iodide, 1,4-dibromobutane, boron trifluoride etherate, antimony pentafluoride, p-toluene sulfonic acid, oleum, dimethyl sulfate, sulfuric acid, nitric acid, perchloric acid, hydrobromic acid, hydroiodic acid, methyl-p-toluene sulfonate, the salt of 2-phenyl-2-oxazine with perchloric, hydroiodic or p-toluene sulfonic acid, and the perchlorate salt of 2-(p-chlorophenyl)-2-oxazoline or 2-phenyl-2-oxazoline.

4. A process in accordance with claim 1 wherein said catalyst is selected from the group consisting of dimethyl sulfate, oleum, boron trifluoride etherate, methyl-p-toluene sulfonate, and the perchlorate salt of 2-phenyl-2-oxazoline or 2-(p-chlorophenyl)-2-oxazoline.

5. A process in accordance with claim 1 wherein the mol ratio of monomer to catalyst is between about 2,000:1 and about 12,000:1.

6. A process in accordance with claim 1 wherein R contains from 1 to 20 carbon atoms.

7. A process for the preparation of polymers comprising recurring units of the formula:

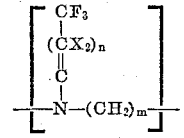

wherein $m$ is 2 or 3 and $n$ is an integer from 0 to 15, and X at each occurrence is independently fluorine, chlorine or hydrogen, which comprises heating monomer of the formula:

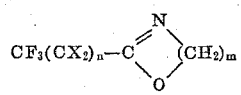

wherein $m$, $n$ and X are as defined above, at a temperature between about 20° and about 250° C. in the presence of a catalyst selected from the group consisting of dimethyl sulfate, oleum, boron trifluoride etherate, methyl-p-toluene sulfonate, and the perchlorate salt of 2-phenyl - 2-oxazoline or 2-(p-chlorophenyl)-2-oxazoline and wherein the mol ratio of monomer to catalyst is between about 50:1 and about 60,000:1.

8. A process in accordance with claim 7 wherein said catalyst is dimethyl sulfate.

9. A process for the preparation of polymers comprising recurring units of the formula:

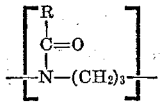

wherein R is selected from the group consisting of hydrocarbon radicals and halogenated hydrocarbon radicals which comprises heating a monomer of the formula:

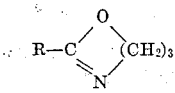

wherein R has the meaning given above, at a temperature between about 20° and about 250° C. in the presence of a catalyst material selected from the group consisting of alkyl halides, boron-fluorine compounds, antimony-fluorine compounds, strong acids, salts of strong acids with oxazolines, salts of strong acids with oxazines and esters of strong acids, the mol ratio of monomer to catalyst being between about 50:1 and about 60,000:1.

10. A process in accordance with claim 9 wherein said catalyst material is selected from the group consisting of dimethyl sulfate, oleum, p-toluene sulfonate, and methyl-p-toluene sulfonate and the perchlorate salt of 2-phenyl-oxazoline or 2-phenyl-oxazine.

11. A process for the preparation of polymers comprising recurring units of the formula:

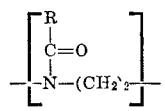

wherein R is selected from the group consisting of hydrocarbon radicals and halogenated hydrocarbon radicals which comprises heating a monomer of the formula:

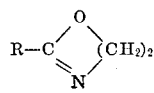

wherein R has the meaning given above, at a temperature between about 20° and about 250° C. in the presence of a catalyst material selected from the group consisting of alkyl halides, boron-fluorine compounds, antimony-fluorine compounds, salts of strong acids with oxazines and esters of strong acids, the mol ratio of monomer to catalyst being between about 50:1 and about 60,000:1.

12. A process for the preparation of a copolymer having a carbon-nitrogen backbone chain comprising heating a mixture of heterocyclic monomers selected from the group consisting of 2-oxazolines and 5,6-dihydro-1,3,4H-oxazines having in the 2-position a substituent selected from the group consisting of hydrocarbon radicals and halogenated hydrocarbon radicals at a temperature between about 20° and about 250° C., in the presence of a catalyst selected from the group consisting of alkyl halides, boron-fluorine compounds, antimony-fluorine compounds, strong acids, salts off strong acids with oxazolines, salts of strong acids with oxazines and esters of strong acids, in a monomer to catalyst mol ratio between about 50:1 and about 60,000:1.

13. A polymer comprising recurring units of the formula:

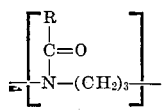

wherein R is a radical selected from the group consisting of hydrocarbon radicals and halogenated hydrocarbon radicals.

14. A polymer in accordance with claim 13 wherein said radical R has from 1 to 20 carbon atoms.

15. A polymer in accordance with claim 13 wherein said radical R has the formula $CF_3(CX_2)_n$— wherein $n$ is an integer of 0 to 15 and wherein X at each occurrence is independently hydrogen or halogen.

16. A polymer in accordance with claim 15 wherein X is fluorine or chlorine.

17. A polymer in accordance with claim 15 wherein every X is fluorine.

18. A polymer in accordance with claim 17 wherein $n$ is at least 4.

19. Poly(N-trimethyleneperfluorooctanoamide).
20. Poly(N-trimethylene benzamide).
21. Poly(N-trimethylene acetamide).
22. Poly(N-trimethylene propionamide).
23. Poly(N-trimethylene caproamide).

24. A high molecular weight, substantially linear polymer consisting essentially of recurring units of the formula:

$$\left[\begin{array}{c} R \\ | \\ C=O \\ | \\ -N-(CH_2)_2- \end{array}\right]$$

wherein R is a hydrocarbon or partially halogenated hydrocarbon radical, said polymer having a reduced viscosity of from at least about 0.6 dl./g. to about 6.2 dl./g. at 25° C. as calculated from the kinematic viscosity measured on a 0.52% solution of polymer in m-cresol in accordance with the procedures of ASTM D445–61.

25. A polymer in accordance with claim 24 wherein said radical R has from 1 to 20 carbon atoms.

26. A polymer in accordance with claim 24 wherein R is a straight chain saturated aliphatic radical of 1 to 16 carbon atoms having a trifluoromethyl terminal group.

27. A polymer in accordance with claim 24 which is poly(N-ethylene acetamide).

28. A polymer in accordance with claim 24 which is poly(N-ethylene propionamide).

29. A polymer in accordance with claim 24 which is poly(N-ethylene isobutyramide).

30. A polymer in accordance with claim 24 which is poly(N-ethylene isovaleramide).

31. A polymer in accordance with claim 24 which is poly(N-ethylene caprylamide).

32. A polymer in accordance with claim 24 which is poly(N-ethylene benzamide).

33. A polymer in accordance with claim 24 which is poly(N-ethylene-β-naphthoamide).

34. A polymer in accordance with claim 24 which is poly(N-ethtylene-p-chlorobenzamide).

35. A polymer in accordance with claim 24 which is poly(N-ethylene-p-toluamide).

36. A polymer in accordance with claim 24 which is poly(N-ethylene cyclohexancarboxamide).

37. A high molecular weight, substantially linear polymer consisting essentially of recurring units of the formula:

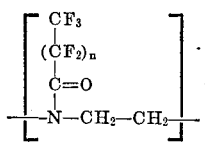

wherein $n$ is 0 to 15, said polymer having a melting point of at least about 216° C.

38. A polymer in accordance with claim 37 wherein $n$ is 1.

39. A polymer in accordance with claim 37 wherein $n$ is at least 4.

40. A polymer in accordance with claim 39 wherein $n$ is 6.

(References on following page)

References Cited

UNITED STATES PATENTS

| | | |
|---|---|---|
| 2,272,489 | 2/1942 | Ulrich. |
| 2,897,182 | 7/1959 | De Benneville et al. -- 260—85.5 |
| 3,198,754 | 8/1965 | Ahlbrecht et al. |
| 2,402,791 | 6/1946 | Wampner _____ 260—307.6 |
| 3,052,669 | 9/1962 | Gavlin et al. _____ 260—307.6 |

OTHER REFERENCES

Kern et al., "Journal fur Praktische Chemie," vol. 159 (1941), pp. 193–218, pp. 214–218 only need (TPI J89).

SAMUEL H. BLECH, Primary Examiner

U.S. Cl. X.R.

117—135.5, 142, 143, 155, 161; 260—30.2, 29.2, 244, 307, 78, 32.6, 33.4 33.6, 33.8

PO-1050
(5/69)

UNITED STATES PATENT OFFICE
CERTIFICATE OF CORRECTION

Patent No. 3,483,141          Dated December 9, 1969

Inventor(s) Litt, Morton H.; Levy, Alan J.; and Bassiri, Taghi G.

It is certified that error appears in the above-identified patent and that said Letters Patent are hereby corrected as shown below:

Column 2, line 15, "ASTEM" should be --ASTM--;

line 19, "moduls" should be --modulus--.

Column 4, line 44, "dihpdro" should be --dihydro--;

line 75, "bloted" should be --blotted--.

Column 5, line 47, "methylpyrolidone" should be --methylpyrrolidone--.

Column 6, line 32, "preared" should be --prepared--;

line 68, "visvosity" should be --viscosity--.

Column 7, line 66, after "24" insert --hours--.

Column 8, line 72, "4" should be --3--.

Column 10, line 24, "$\eta_{sp.}/ = 0.55$ (1.5% sln.)" should be --$\eta_{sp.}/c = 0.55$ (1.5% sln.)--;

line 62, "un its" should be --units--.

Column 11, line 54, "gram" should be --grams--.

PO-1050
(5/69)

UNITED STATES PATENT OFFICE
CERTIFICATE OF CORRECTION

Patent No. 3,483,141     Dated December 15, 1969

Inventor(s) Litt, Morton H.; Levy, Alan J.; and Bassiri, Taghi G.

It is certified that error appears in the above-identified patent and that said Letters Patent are hereby corrected as shown below:

Claim 7, column 12, lines 41-48, the formula

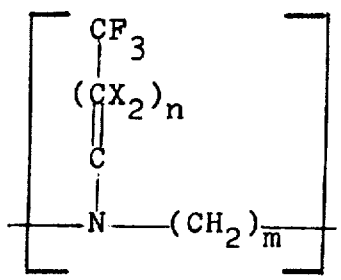 should be 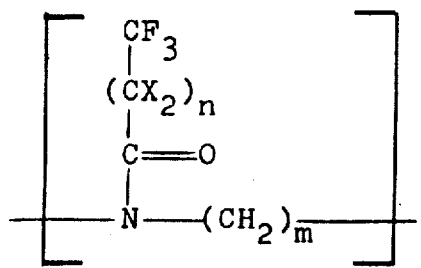

Claim 12, column 13, line 60, "off" should be --of--.

Also, a duplicate of columns 5 through 8 was found bound in subject patent.

SIGNED AND
SEALED
JUN 2 1970

(SEAL)
Attest:

Edward M. Fletcher, Jr.
Attesting Officer

WILLIAM E. SCHUYLER, JR.
Commissioner of Patents